US012658803B2

(12) United States Patent
Cao et al.

(10) Patent No.: US 12,658,803 B2
(45) Date of Patent: Jun. 16, 2026

(54) ON-TIME GENERATOR CIRCUIT AND SWITCHING CONVERTER

(71) Applicant: Joulwatt Technology Co., Ltd., Hangzhou (CN)

(72) Inventors: Zhuang Cao, Hangzhou (CN); Feng Xu, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 195 days.

(21) Appl. No.: 18/788,299

(22) Filed: Jul. 30, 2024

(65) Prior Publication Data

US 2025/0096682 A1      Mar. 20, 2025

(30) Foreign Application Priority Data

Sep. 20, 2023 (CN) .......................... 202311220875.8

(51) Int. Cl.
*H02M 3/158* (2006.01)
*H02M 1/00* (2006.01)
*H02M 1/38* (2007.01)
*H02M 1/088* (2006.01)

(52) U.S. Cl.
CPC ......... *H02M 3/158* (2013.01); *H02M 1/0083* (2021.05); *H02M 1/38* (2013.01); *H02M 1/0022* (2021.05); *H02M 1/0025* (2021.05); *H02M 1/088* (2013.01)

(58) Field of Classification Search
CPC ...... H02M 3/158; H02M 1/0083; H02M 1/38; H02M 1/0022; H02M 1/0025; H02M 1/088
See application file for complete search history.

(56) References Cited

U.S. PATENT DOCUMENTS

2020/0021191 A1* 1/2020 Huang .................. H02M 3/158

* cited by examiner

*Primary Examiner* — Crystal L Hammond
*Assistant Examiner* — Jonathan Walter Soileau
(74) *Attorney, Agent, or Firm* — Bayramoglu Law Offices LLC

(57) ABSTRACT

The provided is an on-time generator circuit and a switching converter. The on-time generator circuit includes a ramp module configured to generate a ramp signal based on a drive signal of a main power transistor and an input voltage; a compensation module configured to generate a compensation signal based on the input voltage and a duty cycle; and a timing signal generation module configured to generate a timing signal based on the ramp signal, the compensation signal, and an output feedback signal. The compensation signal is used to offset delay time generated by the timing signal, making turn-on time (Ton) be preset Ton corresponding to the duty cycle, and keeping a switching frequency constant at different duty cycles.

18 Claims, 6 Drawing Sheets

ON-TIME GENERATOR CIRCUIT AND SWITCHING CONVERTER

CROSS-REFERENCE TO THE RELATED APPLICATIONS

This application is based upon and claims priority to Chinese Patent Application No. 202311220875.8, filed on Sep. 20, 2023, the entire contents of which are incorporated herein by reference.

TECHNICAL FIELD

The present disclosure relates to the technical field of power electronics, and specifically, to an on-time generator circuit and a switching converter.

BACKGROUND

A buck converter with constant on time (COT) architecture has become a research hotspot in the field of direct current (DC)-DC switching power supplies due to its advantages of a fast transient response, a simple structure, and a high light load efficiency. In a COT control mode, turn-on time (Ton) of a main power transistor is constant. A duty cycle is changed by adjusting turn-off time (Toff) to stably control an output voltage. However, since there is no fixed clock, the COT control mode actually belongs to a variable-frequency control mode. In addition, due to a variable operating frequency of the COT control mode, a design of a peripheral electro-magnetic interference (EMI) filter circuit has become a challenge. Therefore, a constant-frequency COT architecture has become a significant research topic.

As shown in FIG. 1, one existing solution is to propose adaptive constant on time (ACOT) control. In an ACOT control mode, the Ton is inversely proportional to an input voltage and directly proportional to the output voltage. This can offset impacts of the input voltage and the output voltage on a switching frequency, thereby making the switching frequency approximately unchanged. However, due to a delay of a comparator in such a circuit structure, long Ton is generated, which in turn decreases a switching frequency of a switching converter. In addition, as a duty cycle of the switching converter decreases, a delay of an on-time generator circuit increases a decrease magnitude of the switching frequency.

Therefore, in the prior art, there is an urgent need for an on-time generator circuit, which can eliminate an impact caused by the delay of the circuit itself to control actual Ton of the main power transistor to be equal to preset Ton, and can also adaptively overcome the impact caused by the delay of the circuit based on a change in the duty cycle of the switching converter to keep the switching frequency of the switching converter constant at different duty cycles.

SUMMARY

To address the aforementioned technical problems, the present disclosure provides an on-time generator circuit and a switching converter. The on-time generator circuit is configured to control Ton of a main power transistor in the switching converter, and includes:

a ramp module configured to generate a ramp signal based on a drive signal of the main power transistor and an input voltage of the switching converter;

a compensation module configured to generate a compensation signal based on the input voltage of the switching converter and a duty cycle of the switching converter; and a timing signal generation module configured to generate a timing signal based on the ramp signal, the compensation signal, and an output feedback signal, where the timing signal represents the Ton of the main power transistor, and the output feedback signal represents an output of the switching converter; where the compensation signal is used to offset delay time generated by the timing signal, so as to keep a switching frequency of the main power transistor constant at different duty cycles.

Further, when the input voltage keeps constant, there is an inverse proportion relationship between the compensation signal and the duty cycle of the switching converter.

Further, an inverse proportion coefficient of the inverse proportion relationship is obtained based on a switching cycle of the main power transistor and the delay time.

Preferably, the ramp module is configured to generate a first ramp signal based on the drive signal in an effective state and the input voltage, where a slope of the first ramp signal is greater than zero, and the drive signal in an effective state drives the main power transistor to turn on.

Preferably, the timing signal generation module includes:

a comparison unit configured to compare a superimposed signal of the compensation signal and the ramp signal with the output feedback signal to generate a turn-off trigger signal that controls turn-off of the main power transistor; and a logic unit configured to generate the timing signal after performing logical processing on the turn-off trigger signal.

Further, superposition of the compensation signal and the first ramp signal increases the slope of the first ramp signal.

Preferably, the ramp module includes a first current source, a first capacitor, and a first switching transistor, where a positive terminal of the first capacitor is connected to the first current source, a negative terminal of the first capacitor is grounded, the first switching transistor is connected in parallel with the first capacitor, and the positive terminal of the first capacitor is connected to the timing signal generation module.

Preferably, the compensation module includes a second current source, a second capacitor, and a second switching transistor, where a positive terminal of the second capacitor is connected to the second current source, a negative terminal of the second capacitor is grounded, a first current terminal of the second switching transistor is connected to the second current source, and a second current terminal of the second switching transistor is connected to the positive terminal of the first capacitor.

Preferably, the comparison unit includes a comparator, the logic unit includes a reset-set (RS) trigger, and the comparator includes a reverse-phase input terminal configured to receive the output feedback signal, a normal-phase input terminal configured to receive the superimposed signal, and an output terminal connected to a reset terminal of the RS trigger.

A switching converter is provided, including a buck switching converter, where the switching converter includes the on-time generator circuit described above, and the on-time generator circuit is configured to control Ton of a main power transistor of the switching converter.

The on-time generator circuit provided in the present disclosure can generate compensation signals of different sizes based on the duty cycle of the switching converter to offset an impact caused by a delay of the circuit itself. Therefore, when the duty cycle is a certain value, the Ton of the main power transistor is controlled to be preset Ton corresponding to the duty cycle, and the constant switching frequency can be achieved when the duty cycle changes.

DETAILED DESCRIPTION OF THE EMBODIMENTS

Figure 1:
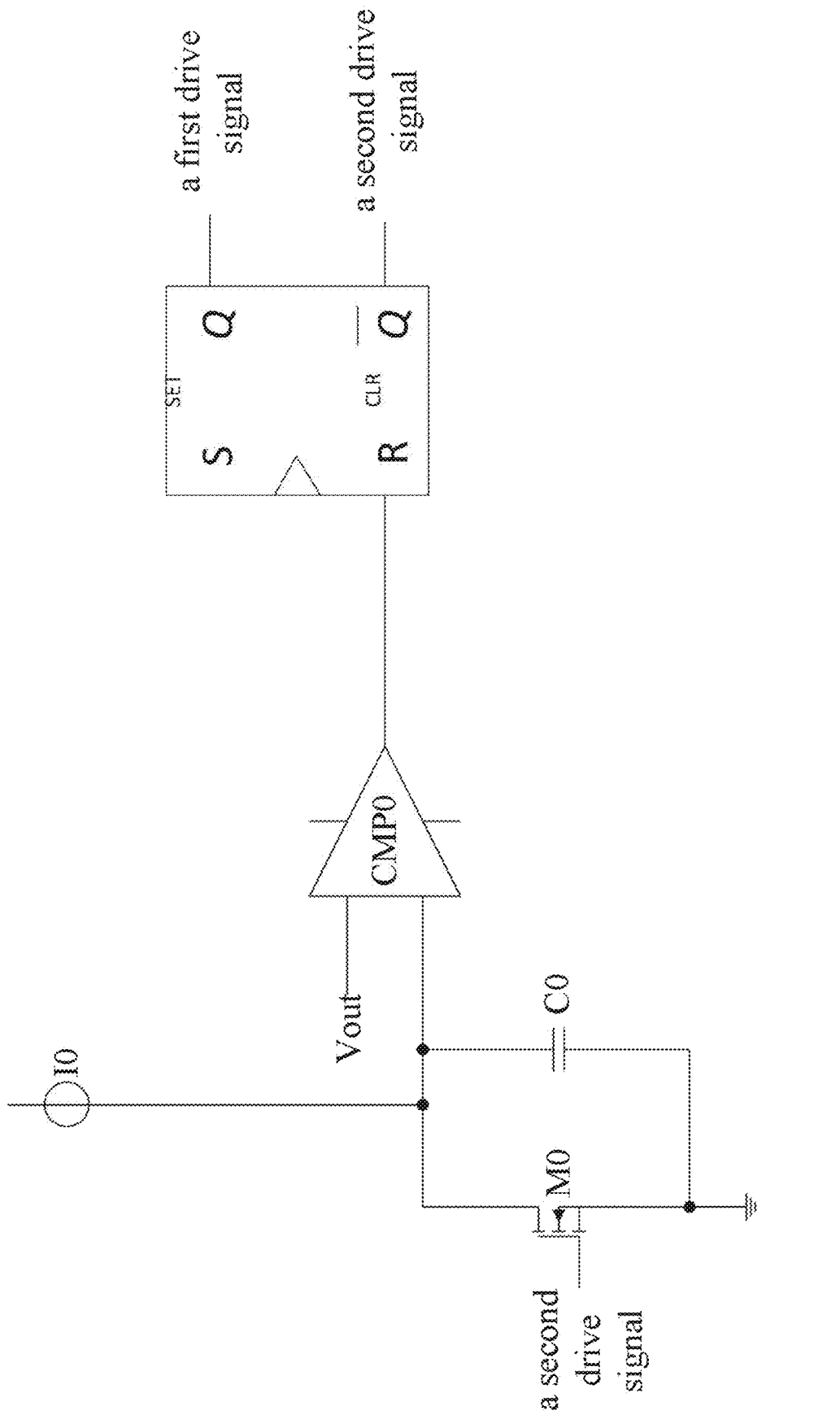
FIG. 1 shows an on-time generator circuit in the prior art.

FIG. 1 shows an on-time generator circuit in the prior art, which is configured to control turn-on time (Ton) of a main power transistor in a switching converter, such that the Ton of the main power transistor is preset Ton. When a first drive signal in an effective state controls the main power transistor to turn on, switching transistor M0 is turned off, and capacitor C0 is charged by using current source I0 directly proportional to input voltage Vin. In this case, voltage Vramp on the capacitor C0 increases linearly. When the Vramp is greater than output voltage Vout of the switching converter, output signal Ton-reset of comparator CMP0 flips, and the first drive signal in the effective state is reset to output the first drive signal in an ineffective state. The first drive signal in the ineffective state controls the main power transistor to turn off. From this, it can be seen that in the prior art, turn-off time of the main power transistor is controlled by comparing the output voltage Vout and the Vramp through the comparator CMP0. In this way, the Ton of the main power transistor is controlled to be the preset Ton.

According to a formula for charging the capacitor C0 by using the current source I0, it can be concluded that:

$$\frac{Vin}{R} Ton = Vout * C0$$

Therefore, the Ton of the main power transistor is theoretically the preset Ton. The preset Ton satisfies a following condition:

$$Ton = \frac{Vout}{Vin} R * C0 = D * R * C0,$$

where D represents a duty cycle. Therefore, it can be inferred that theoretical switching cycle T satisfies a following condition:

$$T = \frac{Ton}{D} = R * C0.$$

That is, the theoretical switching cycle T is a constant value independent of the input voltage Vin and the output voltage Vout. Therefore, a theoretical switching frequency also keeps constant.

However, in a practical application, there is a delay in the comparator in the circuit, and the delay is denoted as Td. When the Vramp increases to the output voltage Vout, an output of the comparator does not immediately flip. Instead, the output of the comparator flips after the Td after the Vramp increases to the output voltage Vout. Therefore, actually, the Ton of the main power transistor is too long, and actual Ton' satisfies a following condition: Ton'=Ton+Td.

Further, due to an impact caused by the delay of the circuit, the actual Ton of the main power transistor is too long. Therefore, a switching frequency of the switching converter is also affected and cannot keep constant. Specifically, actual switching cycle T'=T $$\left(1 + \frac{Td}{Ton}\right).$$

If it is denoted that $$\Delta 1 = \frac{Td}{Ton},$$

$\Delta 1$ represents a proportion of the delay time Td to the preset Ton. In addition, because $$f = \frac{1}{T\left(1 + \frac{Td}{Ton}\right)} = \frac{1}{T(1 + \Delta 1)},$$

if the input voltage and/or the output voltage are/is changed in the practical application to reduce the duty cycle D, a decrease magnitude of the switching frequency increases. That is, if the duty cycle of the switching converter decreases, the delay time Td results in a greater decrease in the switching frequency f, which makes a subsequent filter design more complex.

Therefore, to solve various problems caused by a delay in an existing on-time generator circuit, the present disclosure provides an on-time generator circuit configured to control Ton of a main power transistor in a switching converter. The on-time generator circuit includes:

a ramp module configured to generate a ramp signal based on a drive signal of the main power transistor and an input voltage of the switching converter;

a compensation module configured to generate a compensation signal based on the input voltage of the switching converter and a duty cycle of the switching converter; and a timing signal generation module configured to generate a timing signal based on the ramp signal, the compensation signal, and an output feedback signal, where the timing signal represents the Ton of the main power transistor, and the output feedback signal represents a size of an output of the switching converter.

The compensation signal is used to offset delay time generated by the timing signal. Therefore, when the duty cycle is a certain value, the Ton of the main power transistor is controlled to be preset Ton corresponding to the duty cycle, and a switching frequency of the main power transistor keeps constant when the duty cycle changes.

Therefore, the on-time generator circuit provided in the present disclosure can generate compensation signals of different sizes based on the duty cycle of the switching converter to offset an impact caused by a delay of the circuit itself. Therefore, when the duty cycle is the certain value, the Ton of the main power transistor is controlled to be the preset Ton corresponding to the duty cycle, and the switching frequency can keep constant when the duty cycle changes.

The on-time generator circuit provided in the present disclosure will be further described below with reference to specific embodiments.

Figure 2:
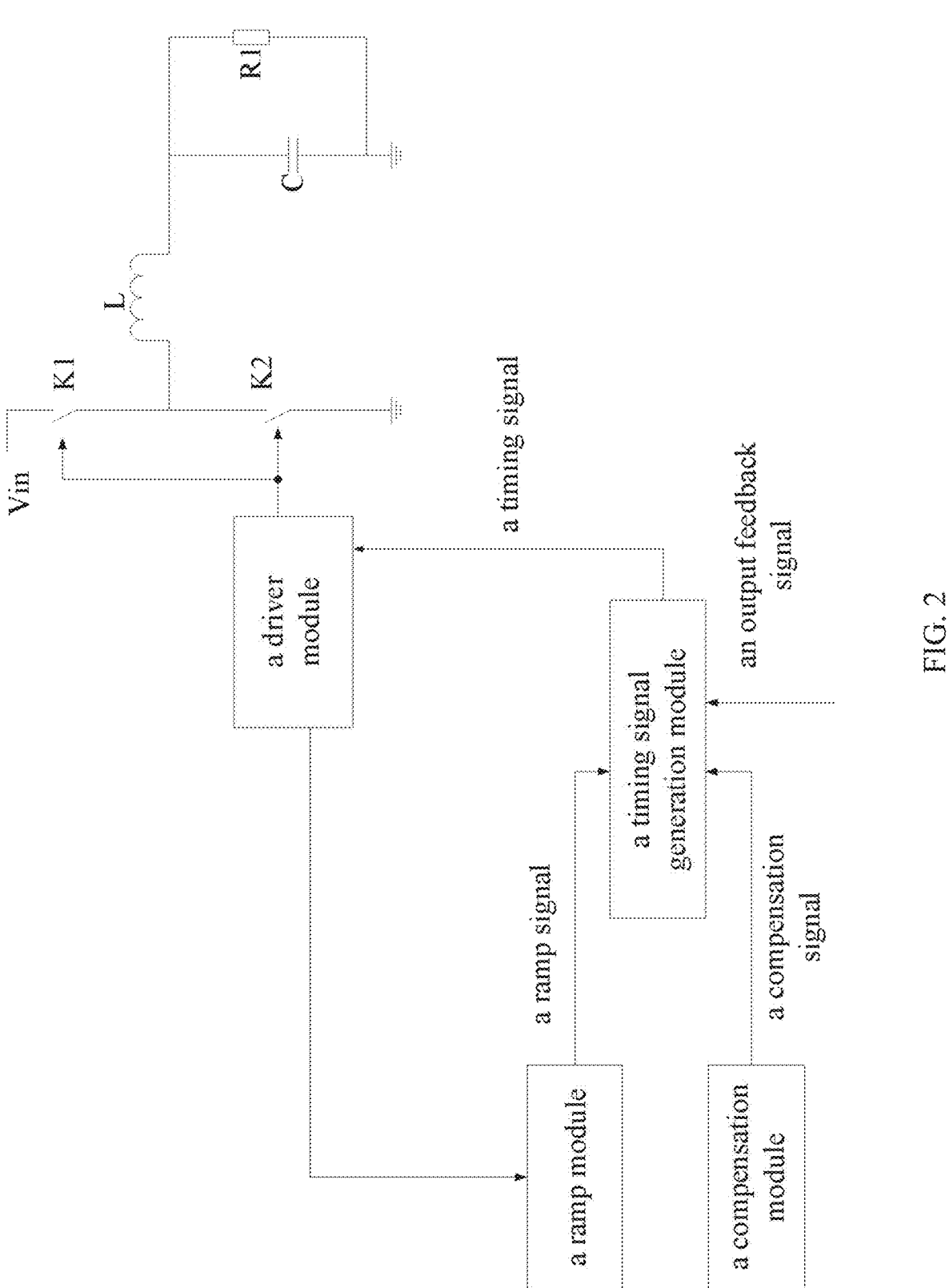
FIG. 2 is a structural block diagram of an on-time generator circuit according to the present disclosure.
Figure 3:
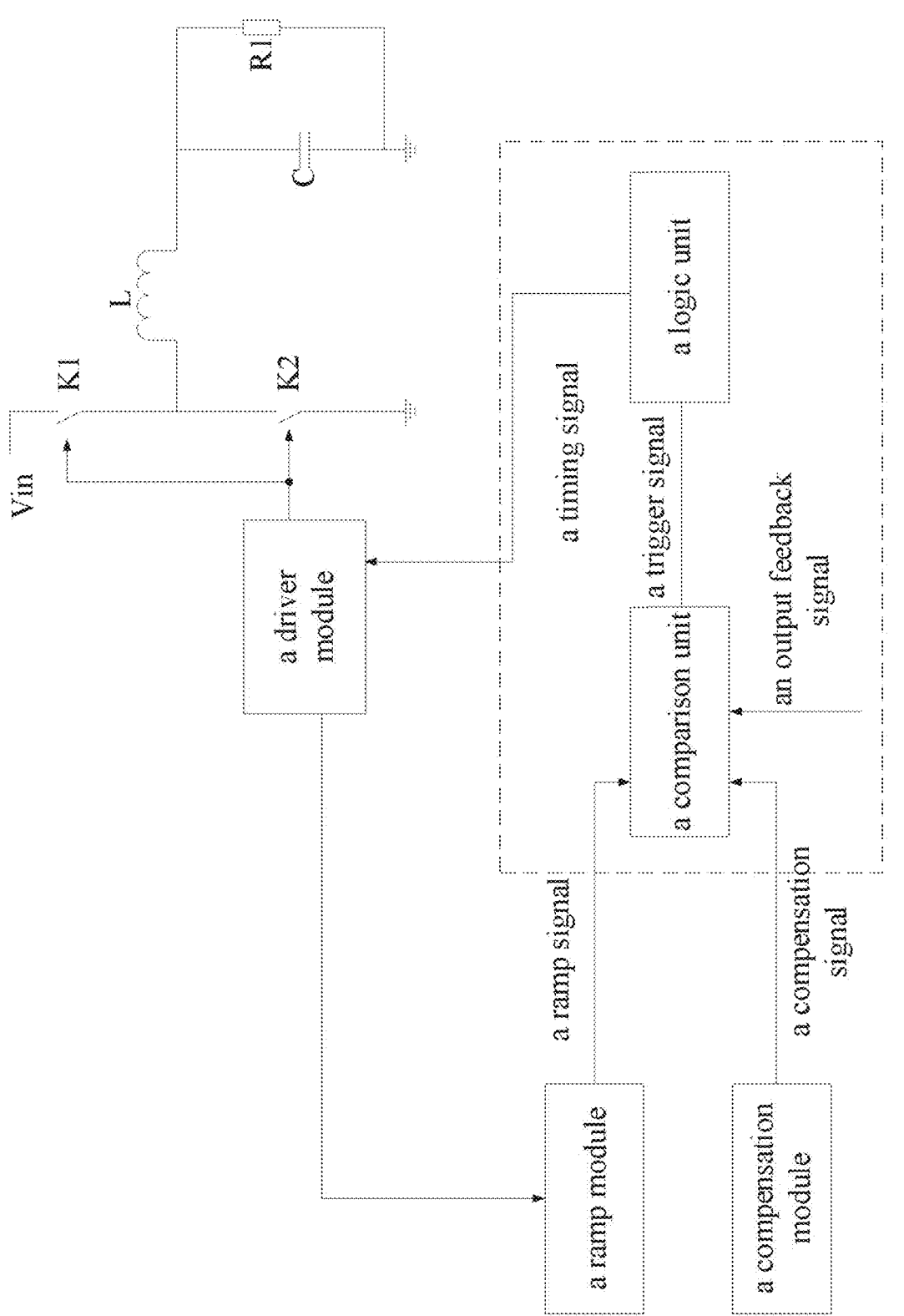
FIG. 3 is a further detailed structural block diagram of an on-time generator circuit according to the present disclosure.

As shown in FIG. 2 and FIG. 3, an on-time generator circuit provided in the present disclosure includes:

a ramp module configured to generate a first ramp signal based on a drive signal in an effective state and an input voltage, where a slope of the first ramp signal is greater than zero, and the drive signal in the effective state drives a main power transistor to turn on;

a compensation module configured to generate a compensation signal based on the input voltage and a duty cycle of a switching converter, where when the input voltage keeps constant, there is an inverse proportion relationship between the compensation signal and the duty cycle, and an inverse proportion coefficient of the inverse proportion relationship is $$\frac{Td}{T} * \frac{1}{R};$$

and a timing signal generation module including a comparison unit and a logic unit, where the comparison unit is configured to obtain a turn-off trigger signal by comparing a superimposed signal of the compensation signal and the ramp signal with an output voltage of the switching converter, and superposition of the compensation signal and the ramp signal increases the slope of the first ramp signal; and the logic unit is configured to generate a timing signal after performing a logical operation on the turn-off trigger signal.

Specifically, as shown in FIG. 3, the ramp module includes first current source I1, first capacitor C1, and first switching transistor M1. A positive terminal of the first capacitor C1 is connected to an output terminal of the first current source I1, a negative terminal of the first capacitor C1 is grounded, and the first switching transistor M1 is connected in parallel with the first capacitor C1. The compensation module includes second current source I2, second capacitor C2, and second switching transistor M2. A positive terminal of the second capacitor C2 is connected to an output terminal of the second current source I2, a negative terminal of the second capacitor C2 is grounded, a drain of the second switching transistor M2 is connected to the positive terminal of the second capacitor C2, and a source of the second switching transistor M2 is connected to the positive terminal of the first capacitor C1. An output current of the first current source I1 is Vin/R, and an output current of the second current source I2 is kVin/R. A sum of capacitance values of the first capacitor C1 and the second capacitor C2 is equal to a capacitance value of capacitor C0.

Figure 4:
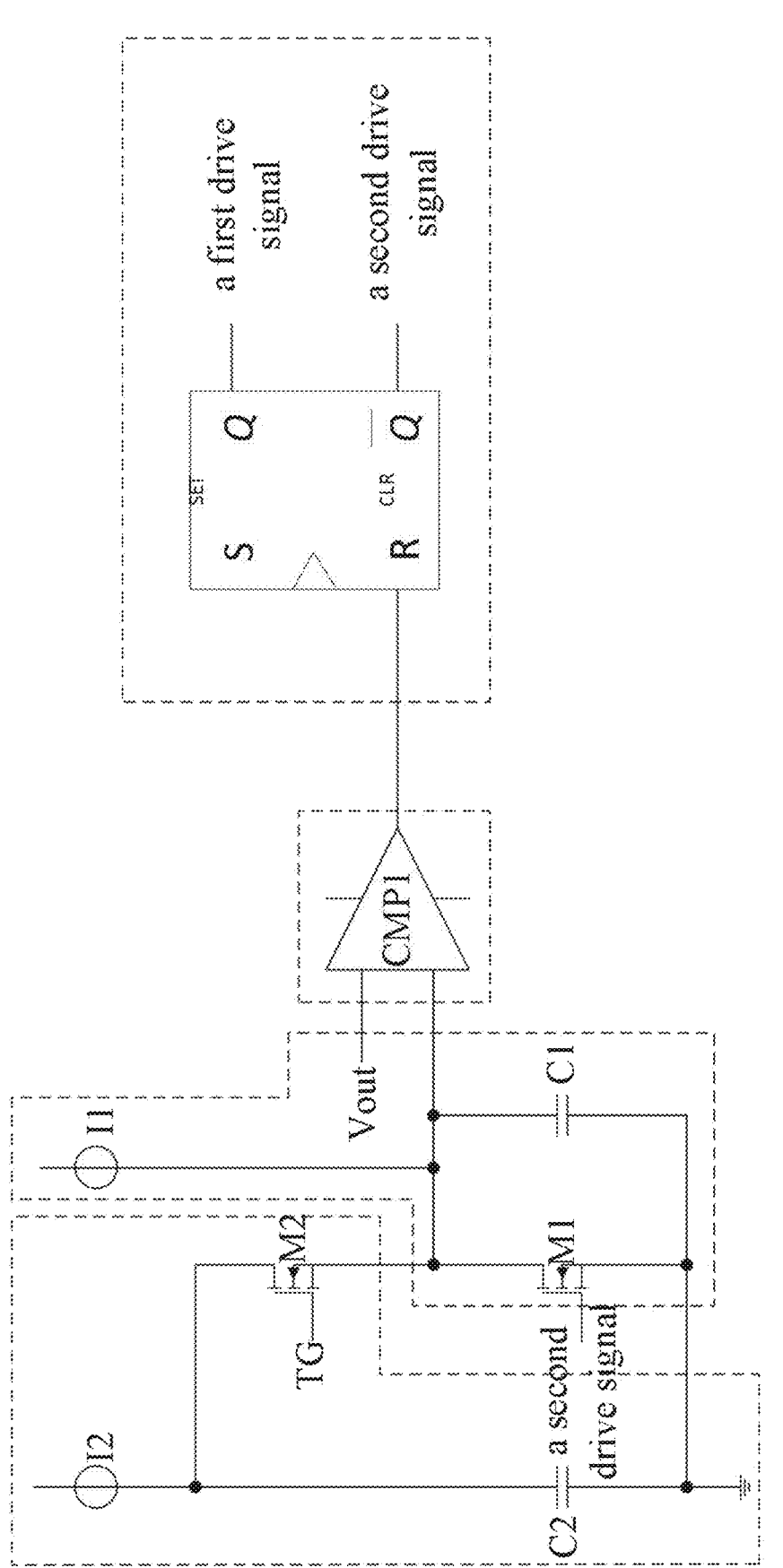
FIG. 4 is a specific circuit structure of an on-time generator circuit according to the present disclosure.

Further, as shown in FIG. 4, the comparison unit includes comparator CMP1, and the logic unit includes an RS trigger. The comparator CMP1 includes a reverse-phase input terminal configured to receive the output voltage, a normal-phase input terminal configured to receive the superimposed signal of the ramp signal and the compensation signal, and an output terminal connected to a reset terminal of the RS trigger.

Figure 5:
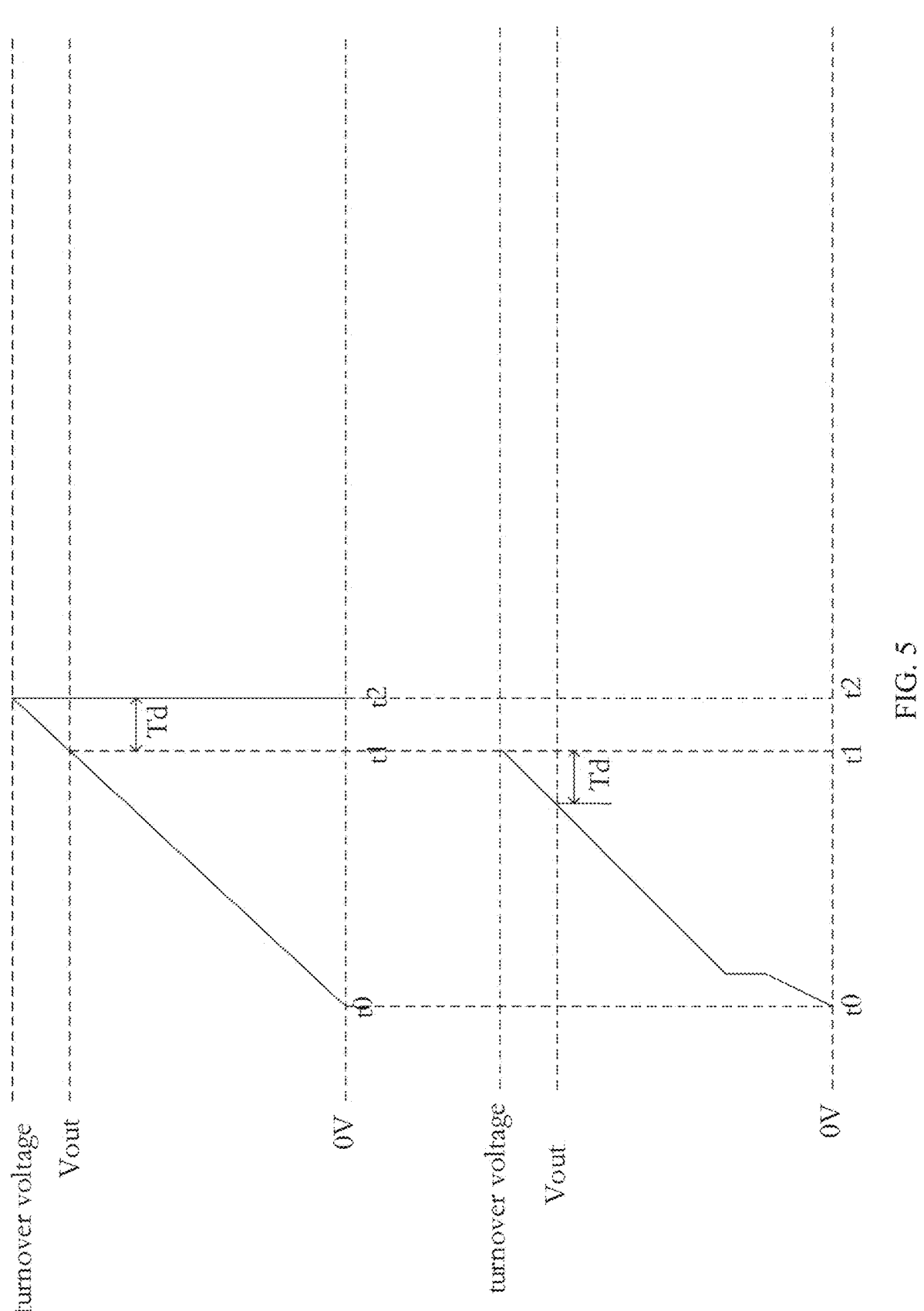
FIG. 5 compares flipping time of a comparator in an on-time generator circuit in the prior art and flipping time of a comparator in an on-time generator circuit according to the present disclosure.

In summary, a working principle of the on-time generator circuit is as follows: When a first drive signal in the effective state drives the main power transistor to turn on, a second drive signal in an ineffective state controls the first switching transistor M1 to turn off, and the first current source I1 begins to charge the first capacitor C1. Positive voltage Vramp of the first capacitor C1 increases linearly. During turn-on of the main power transistor, the drive signal TG controls the second switching transistor M2 to turn on, and the second capacitor C2 and the first capacitor C1 share a charge. Afterwards, the first current source I1 and the second current source I2 simultaneously charge the first capacitor C1 and the second capacitor C2. Therefore, in a charging process of the first capacitor C1, the second capacitor C2 storing a charge performs charge compensation on the first capacitor C1, thereby increasing an increase slope of the Vramp. In this way, output flipping time of the comparator CMP1 is advanced, thereby offsetting an impact caused by a delay of the comparator CMP1. The RS trigger then determines turn-off time of the main power transistor based on the output flipping time of the comparator CMP1, thereby outputting a complete first drive signal in the effective state. As shown in FIG. 5, the implementation shows output flipping time of comparator CMP0. If there is no delay in output flipping of the comparator CMP0, the output flipping occurs at time t1. However, due to presence of the delay time Td, the comparator CMP0 actually experiences the output flipping at time t2. The present disclosure compensates for the ramp signal to enable the comparator CMP1 to experience the output flipping at the time t1, thereby offsetting the delay time Td.

Figure 6:
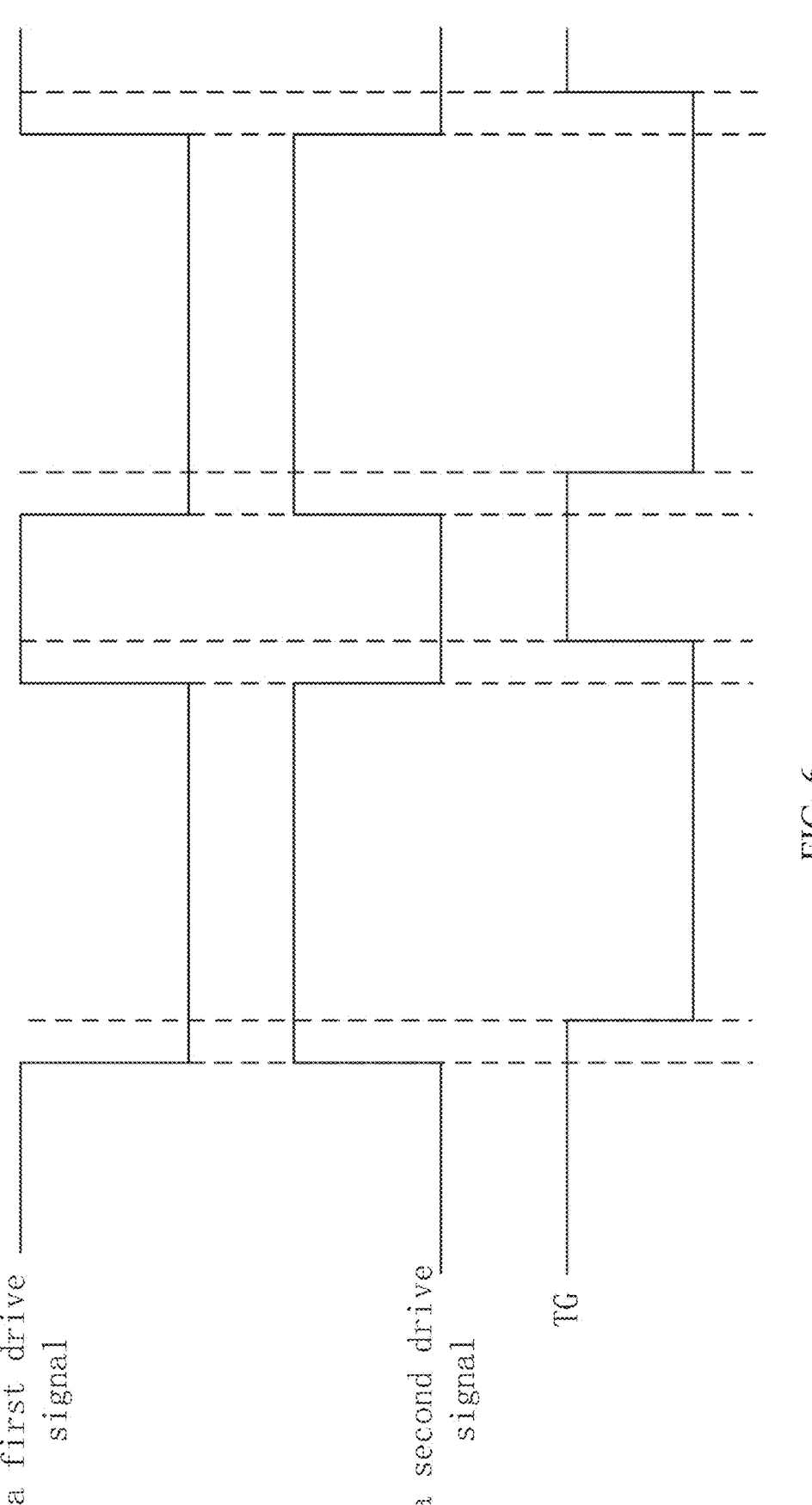
FIG. 6 is a sequence chart of each drive signal in an on-time generator circuit according to the present disclosure.

It should be noted that, as shown in FIG. 6, considering that the second capacitor C2 needs to be discharged after being charged, to repeat the above process, generation time of the drive signal TG is slightly later than generation time of the second drive signal in the ineffective state. Therefore, a time difference between the generation time of the two drive signals can be used to discharge the second capacitor C2.

In summary, it can be seen that by controlling the output flipping time of the comparator CMP1 to advance to offset delay stiffness of the comparator CMP1, the present disclosure controls the Ton of the main power transistor to be the preset Ton within the switching cycle T.

The following theoretical analysis process can further elaborate a principle of the present disclosure. Charging time of the first current source I1 is the preset Ton, and charging time of the second current source I2 is T. According to a capacitor voltage equation, it can be inferred that:

$$\frac{Vin}{R}Ton + k\frac{Vin}{R}T = Vout(C1 + C2)$$

Because C1+C2=C0, $$\frac{Vin}{R} + k\frac{T}{Ton}\frac{Vin}{R})$$

Ton=Vout*C0. Therefore, $$k \frac{T}{Ton} \frac{Vin}{R} = k \frac{1}{D} * \frac{1}{R} * Vin$$

can be equivalent to an equivalent compensation current generated by the second current source I2 within the preset Ton. The equivalent compensation current can represent the compensation signal, and it can be known that there is an inverse proportion relationship between an equivalent current and the duty cycle when the input voltage is constant.

Then, according to an equation It=VC, it can be obtained that when the VC keeps unchanged, if $$I = \frac{Vin}{R}\left(1 + k \frac{T}{Ton}\right) = \frac{Vin}{R}(1 + \Delta 2),$$

$$t = Ton * \frac{1}{1 + \Delta 2} = Ton\left(1 - \frac{\Delta 2}{1 + \Delta 2}\right) = Ton(1 - \Delta 2),$$

where Δ2 is a small quantity.

Because the equivalent compensation current compensates for the Vramp, flipping time of the comparator CMP is advanced, thereby offsetting the delay time Td. Therefore, the preset Ton satisfies a following condition:

Ton=Ton(1−Δ2)+Td. Therefore, TonΔ2=Td, and $$\Delta 2 = \frac{Td}{Ton} = \Delta 1.$$

Then it can be obtained that $$k = \frac{Td}{T}.$$

Therefore, it can be further known that when the input voltage is constant, there is the inverse proportion relationship between the equivalent current and the duty cycle. The inverse proportion coefficient is $$\frac{Td}{T} * \frac{1}{R},$$

where R is a constant value related to an overall structural parameter of the switching converter. Technicians in this field can obtain a specific value of R based on a specific circuit structure.

In this embodiment, the first drive signal in the effective state is a high-level signal, the first drive signal in the ineffective state is a low-level signal, and the second drive signal in the ineffective state is a low-level signal. This is not limited in other embodiments. In addition, in this embodiment, the second drive signal and the first drive signal are synchronously generated by two output terminals of the RS trigger, such that the first switching transistor M1 can be synchronously turned off when the main power transistor is turned on. However, in other embodiments, the second drive signal can also be obtained by synchronously inverting the first drive signal.

In summary, the on-time generator circuit provided in the present disclosure can generate compensation signals of different sizes based on the duty cycle of the switching converter to offset an impact caused by a delay of the circuit itself. Therefore, when the duty cycle is a certain value, the Ton of the main power transistor is controlled to be the preset Ton corresponding to the duty cycle, and a constant switching frequency can be achieved when the duty cycle changes.

The present disclosure further provides a switching converter. The switching converter includes the on-time generator circuit described above. The on-time generator circuit is configured to control Ton of a main power transistor of the switching converter. The switching converter is a buck converter.

What is claimed is:

1. An on-time generator circuit, applied to a switching converter, wherein the switching converter comprises a main power transistor, and the on-time generator circuit comprises:

a ramp module configured to generate a ramp signal based on a drive signal of the main power transistor and an input voltage of the switching converter;

a compensation module configured to generate a compensation signal based on the input voltage of the switching converter and a duty cycle of the switching converter; and a timing signal generation module configured to generate a timing signal based on the ramp signal, the compensation signal, and an output feedback signal, wherein the timing signal represents turn-on time (Ton) of the main power transistor, and the output feedback signal represents an output of the switching converter; wherein the compensation signal is configured to offset delay time generated by the timing signal to keep a switching frequency of the main power transistor constant at different duty cycles.

2. The on-time generator circuit according to claim 1, wherein when the input voltage keeps constant, there is an inverse proportion relationship between the compensation signal and the duty cycle of the switching converter.

3. The on-time generator circuit according to claim 2, wherein an inverse proportion coefficient of the inverse proportion relationship is obtained based on a switching cycle of the main power transistor and the delay time.

4. The on-time generator circuit according to claim 1, wherein the ramp module is configured to generate a first ramp signal based on the drive signal in an effective state and the input voltage, a slope of the first ramp signal is greater than zero, and the drive signal in the effective state drives the main power transistor to turn on.

5. The on-time generator circuit according to claim 4, wherein the timing signal generation module comprises:

a comparison unit configured to compare a superimposed signal of the compensation signal and the ramp signal with the output feedback signal to generate a turn-off trigger signal that controls turn-off of the main power transistor; and a logic unit configured to generate the timing signal after performing logical processing on the turn-off trigger signal.

6. The on-time generator circuit according to claim 5, wherein superposition of the compensation signal and the first ramp signal increases the slope of the first ramp signal.

7. The on-time generator circuit according to claim 1, wherein the ramp module comprises a first current source, a first capacitor, and a first switching transistor, wherein a positive terminal of the first capacitor is connected to the first current source, a negative terminal of the first capacitor is grounded, the first switching transistor is connected in parallel with the first capacitor, and the positive terminal of the first capacitor is connected to the timing signal generation module.

8. The on-time generator circuit according to claim 7, wherein the compensation module comprises a second current source, a second capacitor, and a second switching transistor, wherein a positive terminal of the second capacitor is connected to the second current source, a negative terminal of the second capacitor is grounded, a first current terminal of the second switching transistor is connected to the second current source, and a second current terminal of the second switching transistor is connected to the positive terminal of the first capacitor.

9. The on-time generator circuit according to claim 5, wherein the comparison unit comprises a comparator, the logic unit comprises a reset-set (RS) trigger, and the comparator comprises a reverse-phase input terminal configured to receive the output feedback signal, a normal-phase input terminal configured to receive the superimposed signal, and an output terminal connected to a reset terminal of the RS trigger.

10. A switching converter, comprising a buck switching converter, wherein the switching converter comprises the on-time generator circuit according to claim 1, and the on-time generator circuit is configured to control the turn-on time (Ton) of the main power transistor of the switching converter.

11. The switching converter according to claim 10, wherein in the on-time generator circuit, when the input voltage keeps constant, there is an inverse proportion relationship between the compensation signal and the duty cycle of the switching converter.

12. The switching converter according to claim 11, wherein in the on-time generator circuit, an inverse proportion coefficient of the inverse proportion relationship is obtained based on a switching cycle of the main power transistor and the delay time.

13. The switching converter according to claim 10, wherein in the on-time generator circuit, the ramp module is configured to generate a first ramp signal based on the drive signal in an effective state and the input voltage, a slope of the first ramp signal is greater than zero, and the drive signal in the effective state drives the main power transistor to turn on.

14. The switching converter according to claim 13, wherein in the on-time generator circuit, the timing signal generation module comprises:

a comparison unit configured to compare a superimposed signal of the compensation signal and the ramp signal with the output feedback signal to generate a turn-off trigger signal that controls turn-off of the main power transistor; and a logic unit configured to generate the timing signal after performing logical processing on the turn-off trigger signal.

15. The switching converter according to claim 14, wherein in the on-time generator circuit, superposition of the compensation signal and the first ramp signal increases the slope of the first ramp signal.

16. The switching converter according to claim 10, wherein in the on-time generator circuit, the ramp module comprises a first current source, a first capacitor, and a first switching transistor, wherein a positive terminal of the first capacitor is connected to the first current source, a negative terminal of the first capacitor is grounded, the first switching transistor is connected in parallel with the first capacitor, and the positive terminal of the first capacitor is connected to the timing signal generation module.

17. The switching converter according to claim 16, wherein in the on-time generator circuit, the compensation module comprises a second current source, a second capacitor, and a second switching transistor, wherein a positive terminal of the second capacitor is connected to the second current source, a negative terminal of the second capacitor is grounded, a first current terminal of the second switching transistor is connected to the second current source, and a second current terminal of the second switching transistor is connected to the positive terminal of the first capacitor.

18. The switching converter according to claim 14, wherein in the on-time generator circuit, the comparison unit comprises a comparator, the logic unit comprises a reset-set (RS) trigger, and the comparator comprises a reverse-phase input terminal configured to receive the output feedback signal, a normal-phase input terminal configured to receive the superimposed signal, and an output terminal connected to a reset terminal of the RS trigger.

* * * * *